US009091200B2

(12) United States Patent
Lombard et al.

(10) Patent No.: US 9,091,200 B2
(45) Date of Patent: Jul. 28, 2015

(54) TURBOCHARGER AND ENGINE CYLINDER HEAD ASSEMBLY (75) Inventors: Alain Lombard, Vosges (FR); Johann Kurtzmann, Paris (FR); Quentin Roberts, Meurthe et Moselle (FR); Manuel Marques, Flavigny sur Moselle (FR)

(73) Assignee: Honeywell International Inc., Morristown, NJ (US)

( * ) Notice: Subject to any disclaimer, the term of this patent is extended or adjusted under 35 U.S.C. 154(b) by 441 days.

(21) Appl. No.: 13/596,627

(22) Filed: Aug. 28, 2012

(65) Prior Publication Data
US 2013/0247566 A1 Sep. 26, 2013

Related U.S. Application Data (63) Continuation-in-part of application No. 13/425,891, filed on Mar. 21, 2012, now Pat. No. 8,966,894, and a continuation-in-part of application No. 13/425,943, filed on Mar. 21, 2012, now Pat. No. 8,966,895.

(51) Int. Cl.
*F02B 33/44* (2006.01)
*F02F 7/00* (2006.01)
(Continued)

(52) U.S. Cl.
CPC .............. *F02B 37/00* (2013.01); *F01D 25/166* (2013.01); *F01D 25/24* (2013.01); *F02B 37/127* (2013.01); *F02F 1/243* (2013.01); *F05D 2220/40* (2013.01); *Y02T 10/144* (2013.01)

(58) Field of Classification Search
CPC ........ F01D 25/24; F02B 37/00; F02B 37/127; F02F 1/24; F02F 1/243; F02F 1/4214; F02F 2001/247; F02F 7/0073; F02F 7/0082; F02F 2001/42; Y02T 10/144

USPC .......... 60/605.1; 123/195 C; 415/116, 213.1, 415/160, 206 D, 206
See application file for complete search history.

(56) References Cited

U.S. PATENT DOCUMENTS 2,777,632 A * 1/1957 Kishline et al. .............. 60/605.1
3,270,951 A   9/1966 Reed
(Continued)

FOREIGN PATENT DOCUMENTS

DE              975375 C  * 11/1961 ................ F02F 1/24
DE     102007017854 A1 * 10/2008 ................ F02F 1/24
(Continued)

OTHER PUBLICATIONS

International Search Report and Written Opinion for Application No. PCT/US2013/029770, dated Jun. 17, 2013.
(Continued)

*Primary Examiner* — Thai Ba Trieu
(74) *Attorney, Agent, or Firm* — John C. James (57) ABSTRACT A turbocharger and engine cylinder head assembly includes a center housing rotating assembly (CHRA) and an engine cylinder head defining a receptacle for receiving the CHRA, the engine cylinder head defining a compressor volute. A diffuser is defined for receiving and diffusing the compressed air from the compressor wheel and supplying the compressed air to the compressor volute. The assembly includes a cap formed separately from the engine cylinder head and removably secured to the engine cylinder head, the cap defining one wall of the diffuser. An opposite wall of the diffuser is defined either by the engine cylinder head or a portion of the center housing, depending on whether the CHRA slides into the receptacle compressor-wheel-first or turbine-wheel-first. The compressor volute can be located on a turbine side of the diffuser.

12 Claims, 5 Drawing Sheets (51) Int. Cl.
  *F04D 31/00* (2006.01)
  *F01D 25/26* (2006.01)
  *F01D 17/12* (2006.01)
  *F04D 29/44* (2006.01)
  *F04D 29/54* (2006.01)
  *F02B 37/00* (2006.01)
  *F02F 1/24* (2006.01)
  *F01D 25/24* (2006.01)
  *F02B 37/12* (2006.01)
  *F01D 25/16* (2006.01)

(56) References Cited

U.S. PATENT DOCUMENTS

| | | | |
|---|---|---|---|
| 4,075,849 A | 2/1978 | Richardson | |
| 4,463,564 A | 8/1984 | McInerney | |
| 4,613,288 A | 9/1986 | McInerney | |
| 4,630,445 A | 12/1986 | Parker | |
| 4,655,040 A | 4/1987 | Parker | |
| 4,655,043 A | 4/1987 | McInerney | |
| 4,656,834 A | 4/1987 | Elpern | |
| 4,721,441 A | 1/1988 | Miyashita et al. | |
| 4,768,343 A * | 9/1988 | Fischer | 60/605.1 |
| 4,815,184 A | 3/1989 | Johnston et al. | |
| 5,857,337 A | 1/1999 | Kawasaki | |
| 6,193,463 B1 | 2/2001 | Adeff et al. | |
| 7,089,737 B2 | 8/2006 | Claus | |
| 7,428,813 B2 | 9/2008 | Finger et al. | |
| 7,637,106 B2 | 12/2009 | Hertweck et al. | |
| 8,062,006 B2 | 11/2011 | Hummel et al. | |
| 8,092,162 B2 | 1/2012 | Masson et al. | |
| 2005/0069427 A1 | 3/2005 | Roemuss et al. | |
| 2009/0031722 A1 | 2/2009 | An et al. | |
| 2009/0077966 A1 | 3/2009 | Lombard et al. | |
| 2009/0136368 A1 | 5/2009 | Arnold et al. | |
| 2009/0226307 A1 | 9/2009 | Masson et al. | |
| 2010/0080694 A1 * | 4/2010 | Chapman et al. | 415/160 |
| 2010/0180592 A1 | 7/2010 | Williams et al. | |
| 2010/0322106 A1 | 12/2010 | Qiang | |
| 2011/0011085 A1 | 1/2011 | Garrett et al. | |
| 2011/0103936 A1 | 5/2011 | Lombard | |
| 2011/0171017 A1 | 7/2011 | Lingenauber et al. | |
| 2011/0173972 A1 | 7/2011 | Wade et al. | |
| 2011/0200422 A1 | 8/2011 | Gutknecht | |
| 2011/0268559 A1 | 11/2011 | Lombard et al. | |
| 2012/0011845 A1 | 1/2012 | Williams et al. | |
| 2012/0047887 A1 | 3/2012 | Petitjean et al. | |
| 2012/0148386 A1 | 6/2012 | Lombard | |
| 2013/0071243 A1 | 3/2013 | Kocher et al. | |
| 2013/0149126 A1 | 6/2013 | Herrera et al. | |
| 2013/0195620 A1 * | 8/2013 | Joergl et al. | 415/116 |
| 2013/0202431 A1 | 8/2013 | Heidingsfelder et al. | |
| 2013/0223995 A1 | 8/2013 | Lombard et al. | |
| 2013/0247566 A1 | 9/2013 | Lombard et al. | |
| 2013/0287564 A1 * | 10/2013 | Fath et al. | 415/213.1 |

FOREIGN PATENT DOCUMENTS

| | | | | |
|---|---|---|---|---|
| JP | 57-052624 | | 3/1982 | |
| JP | 62162728 A | * | 7/1987 | F02B 37/00 |
| JP | 2002-303145 | | 10/2002 | |
| JP | 2006063851 A | * | 3/2006 | F02F 1/24 |
| JP | 2006-194227 | | 7/2006 | |
| JP | 2006249945 A | * | 9/2006 | F02F 1/24 |
| JP | 2006-266244 A | | 10/2006 | |
| JP | 2010-038091 A | | 2/2010 | |
| JP | 2010-151283 A | | 6/2010 | |
| WO | WO-2010/085494 | | 7/2010 | |
| WO | WO-2011/154874 | | 12/2011 | |

OTHER PUBLICATIONS

International Search Report and Written Opinion for Application No. PCT/US2013/029319, dated Jun. 13, 2013.
International Search Report and Written Opinion for Application No. PCT/US2013/029537, dated Jun. 14, 2013.
Office Action from U.S. Appl. No. 13/425,943, dated Sep. 4, 2014.
Office Action from U.S. Appl. No. 13/425,891, dated Sep. 4, 2014.
U.S. Appl. No. 61/422,485; dated Dec. 13, 2010.

* cited by examiner

TURBOCHARGER AND ENGINE CYLINDER HEAD ASSEMBLY

CROSS-REFERENCE TO RELATED APPLICATIONS

This application is a continuation-in-part of U.S. patent application Ser. No. 13/425,891 filed on Mar. 21, 2012, and of U.S. patent application Ser. No. 13/425,943 filed on Mar. 21, 2012, both of which are currently pending, the entire disclosures of which are hereby incorporated herein by reference.

BACKGROUND OF THE INVENTION

The present disclosure relates to exhaust gas-driven turbochargers.

In a typical turbocharger there is a compressor housing, a center housing, and a turbine housing. The compressor housing defines a volute that collects pressurized air from the compressor wheel for onward delivery to the air intake of an internal combustion engine. The center housing's main role is to house bearings for the shaft that connects the compressor wheel to the turbine wheel. The turbine housing defines a volute that receives exhaust gas from the engine and directs it into the turbine wheel, which is thereby driven to rotate and drive the compressor wheel.

Conventionally, all of the turbocharger housing members are separate components. The compressor housing typically defines not only the compressor volute but also a diffuser that receives pressurized air from the compressor wheel and diffuses it before delivering it into the volute. The diffuser is important in terms of compressor efficiency. In particular, it is important that the diffuser have the dimensions specified by the compressor designer, and accordingly it is generally necessary to machine the diffuser in order to achieve the accuracy that is needed. Such machining is difficult, however, because of the diffuser's location in the casting for the compressor housing.

The machining difficulty is exacerbated when the compressor volute is integrated into an engine cylinder head, as is the case with more-recently proposed turbocharger designs (as described, for example, in the above-noted '891 and '943 applications related to the present disclosure) in which such integration is employed in order to simplify manufacture of the turbocharger and its incorporation into the engine system.

BRIEF SUMMARY OF THE DISCLOSURE

The present disclosure aims to address the above-noted issues. Described herein is a turbocharger and engine cylinder head assembly in which the compressor volute is integrated into the cylinder head, but in which the diffuser is easily accessible for machining to high precision. In embodiments illustrated and described below, a turbocharger and engine cylinder head assembly comprises:

- a center housing rotating assembly comprising a center housing defining a bore therethrough, bearings housed in the bore, a shaft rotatably supported in the bearings, a compressor wheel affixed to one end of the shaft, and a turbine wheel affixed to an opposite end of the shaft;
- an engine cylinder head defining a receptacle for receiving the center housing rotating assembly, the engine cylinder head defining a compressor volute;
- a diffuser for receiving and diffusing the compressed air from the compressor wheel and supplying the compressed air to the compressor volute; and
- a cap formed separately from the engine cylinder head and removably secured to the engine cylinder head, the cap defining one wall of the diffuser.

Two basic embodiments are disclosed. In one embodiment, an opposite wall of the diffuser is defined by a portion of the engine cylinder head. In the other embodiment, the opposite wall of the diffuser is formed by a portion of the center housing. In both cases, the surface forming the opposite wall of the diffuser is easily accessible and thus readily machinable.

In the case of the former embodiment, the assembly is configured so that the center housing rotating assembly is axially received, turbine-wheel-first, into the receptacle in the engine cylinder head. The center housing includes a radially outwardly extending flange defining the opposite wall of the diffuser. The surface of the flange forming the diffuser wall is an easily accessible exterior surface.

In the other embodiment, the assembly is configured so that the center housing rotating assembly is axially received, compressor-wheel-first, into the receptacle in the engine cylinder head. In this case, a portion of the engine cylinder head defines the opposite wall of the diffuser. Again, the surface of the cylinder head forming the diffuser wall is an easily accessible exterior surface.

Variations of the noted embodiments are possible. For example, in either embodiment, the assembly can include a wastegate unit operable for allowing exhaust gas to bypass the turbine wheel when the wastegate unit is open and preventing exhaust gas from bypassing the turbine wheel when the wastegate unit is closed. An actuator is connected by a linkage to the wastegate unit to selectively vary the degree of openness of the wastegate unit.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
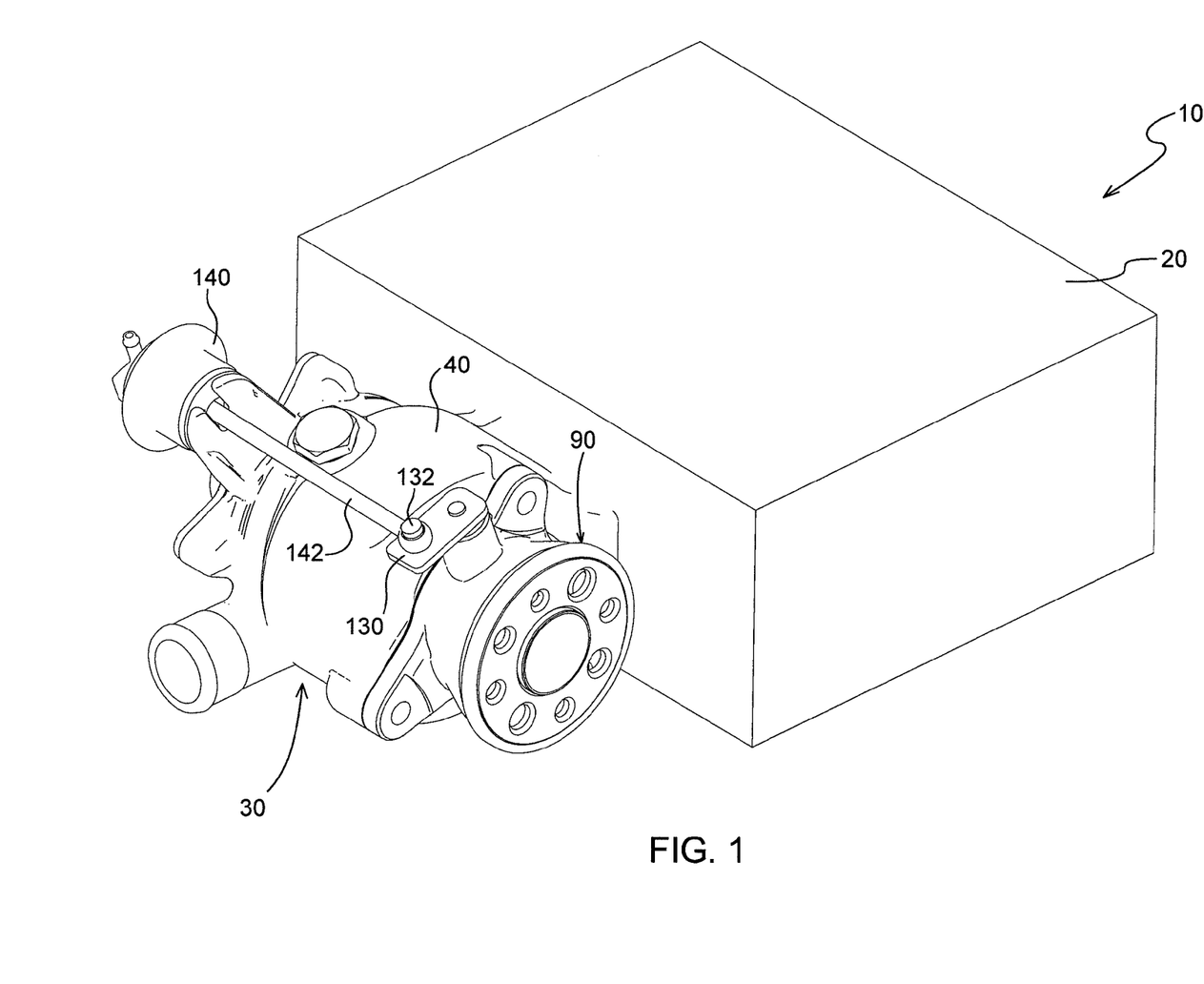
FIG. 1 is a perspective view of a turbocharger and engine cylinder head assembly in accordance with a first embodiment of the present invention.
Figure 2:
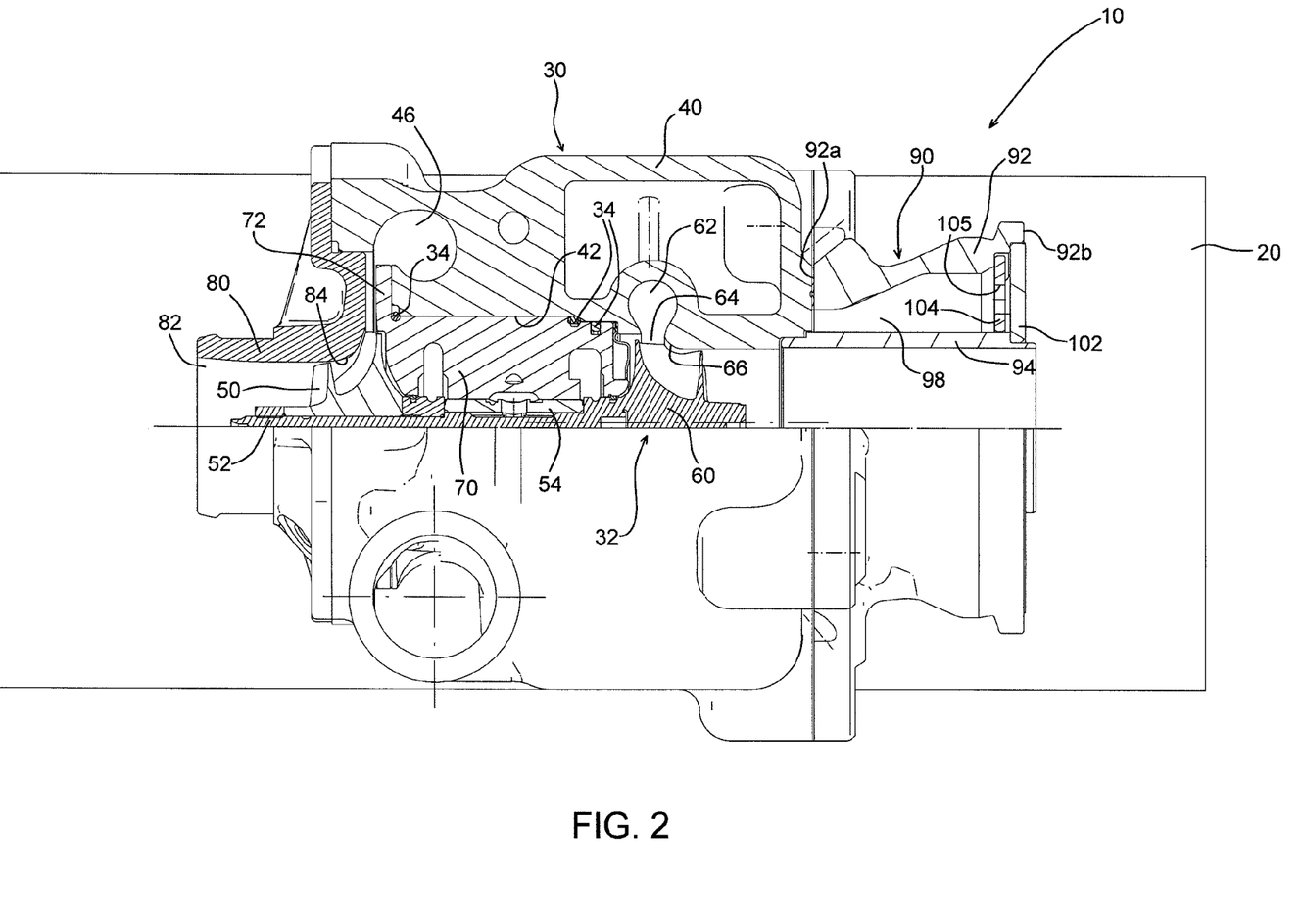
FIG. 2 is a front view of the turbocharger and engine cylinder head assembly of FIG. 1, partly sectioned, and with the actuator, linkage, and wastegate unit removed.
Figure 3:
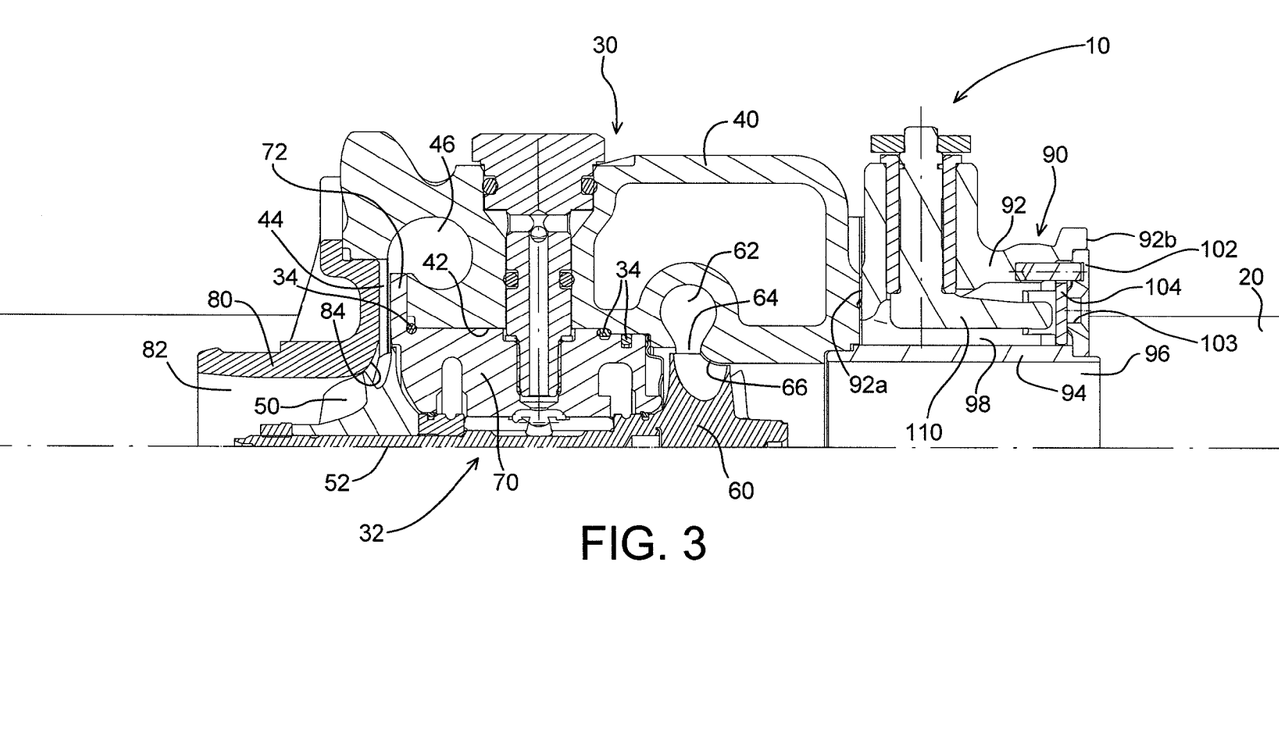
FIG. 3 is a cross-sectional view of the turbocharger and engine cylinder head assembly of FIG. 1.

A turbocharger and engine cylinder head assembly 10 in accordance with one embodiment of the invention is depicted in FIGS. 1-3. With reference initially to FIG. 1, the assembly 10 comprises an engine cylinder head 20 (illustrated only schematically) on which a turbocharger 30 is mounted. The engine cylinder head 20 comprises a casting that is configured to sit atop the engine block, above the engine cylinders. The head 20 typically houses components of the intake and exhaust valves for the cylinders and defines intake and exhaust passages through which intake air is delivered to the cylinders and exhaust gases are routed away from the cylinders, respectively. For each cylinder, the head defines at least one intake passage and at least one exhaust passage (not shown). The head is configured to route the exhaust gases produced in the engine cylinders through the exhaust passages into an exhaust manifold (not shown) that feeds exhaust gases to the turbine of the turbocharger.

The cylinder head 20 defines a housing member 40 as an integral part thereof. The head proper and the housing member collectively can be, for example, a one-piece casting. As further described below, the housing member 40 is configured to define a number of features that would conventionally be defined by separate housing members of the turbocharger 30.

With reference to FIGS. 2 and 3, the turbocharger 30 includes a "cartridge" 32, also referred to herein as a center housing rotating assembly (CHRA). The CHRA 32 comprises a compressor wheel 50 affixed to one end of a shaft 52 and a turbine wheel 60 affixed to the opposite end of the shaft 52, bearings 54 that rotatably support the shaft 52, and a center housing 70 that houses the bearings 54 and defines oil passages for supplying oil to and scavenging oil from the bearings, and (optionally) water passages for circulating coolant through the center housing.

In accordance with the invention, the housing member 40 of the cylinder head 20 defines a receptacle 42 that receives the CHRA 32. The receptacle 42 is a stepped, generally cylindrical bore extending axially through the housing member 40. The receptacle is configured to allow the CHRA 32 to be slid axially into the receptacle, turbine wheel first (i.e., to the right in FIGS. 2 and 3). Thus, the receptacle 42 for example can have various portions of differing inside diameters, with steps transitioning between adjacent portions of different diameters. The steps are compressor-side-facing, i.e., each step faces axially toward the compressor side of the CHRA (to the left in FIGS. 2 and 3), and thus the receptacle becomes progressively smaller in diameter in the direction from the compressor toward the turbine. The center housing 70 of the CHRA 32 is correspondingly stepped to substantially match the stepped configuration of the receptacle 42. There are seals (e.g., O-rings) 34 between the center housing 70 and the receptacle 42 for sealing the interface therebetween and to separate or isolate the oil passages and the water passages (if present) in the center housing.

As noted, the housing member 40 defines features that in conventional turbochargers would be defined by separate turbine and compressor housings. Specifically, the housing member 40 of the engine cylinder head 20 defines a compressor volute 46 that receives compressed air from the compressor wheel 50. The head 20 can also define other turbocharger features such as a turbine volute 62 for receiving exhaust gas from the exhaust gas manifold of the engine, a turbine nozzle 64 for directing exhaust gas from the turbine volute into the turbine wheel 60, and a turbine contour 66 that generally follows the outer contour of the blades of the turbine wheel 60.

The turbocharger and engine cylinder head assembly 10 further comprises a cap 80 that defines one wall of a compressor diffuser 44 through which air compressed by the compressor wheel 50 passes radially outwardly and into the compressor volute 46. An opposite wall of the diffuser 44 is formed by the center housing 70 of the CHRA 32. Specifically, the center housing 70 defines a flange 72 that extends radially outwardly from the compressor end of the center housing, the opposite wall of the diffuser 44 is defined by the flange 72. The flange 72 abuts an end surface of the engine cylinder head when the CHRA 32 is fully inserted into the receptacle 42. The cap 80 is affixed (e.g., by threaded fasteners) to the housing member 40. The cap 80 can also define an axial inlet 82 for the compressor and a compressor contour 84 that generally follows the outer contour of the blades of the compressor wheel 50.

The last major component of the turbocharger and engine cylinder head assembly 10 is an optional wastegate or turbine bypass unit 90. The wastegate unit is operable to allow some or substantially all of the exhaust gases to bypass the turbine wheel 60 under certain operating conditions. In the illustrated embodiment, the wastegate unit 90 is a rotary turbine bypass (RTB) unit generally as described in Applicant's co-pending U.S application Ser. No. 12/611,816 filed on Nov. 3, 2009, application Ser. No. 12/771,434 filed on Apr. 30, 2010, application Ser. No. 12/966,343 filed Dec. 13, 2010, and application Ser. No. 61/422,485 filed Dec. 13, 2010, the entire disclosures of said applications being hereby incorporated herein by reference.

With reference to FIGS. 2 and 3, the RTB unit 90 includes a valve housing assembly comprising a main housing 92 and a housing insert 94. The main housing 92 defines a passage extending through the main housing from a first side 92a to a second side 92b thereof. The housing insert 94 comprises a generally tubular member that is disposed in the passage of the main housing such that the interior of the housing insert 94 defines a central flow passage 96, and an annular space between the outer surface of the housing insert 94 and an inner surface of the main housing 92 defines an annular flow passage (also referred to herein as a wastegate passage) 98 that surrounds the central flow passage 96.

The RTB unit 90 further comprises a stationary valve seat 102 and a rotary valve member 104 in abutting engagement with the valve seat. The valve seat 102 and valve member 104 are arranged in the annular space between the main housing 92 and the housing insert 94. The valve member 104 is prevented from moving axially upstream by a shoulder defined by the main housing 92, although during operation pressure of the exhaust gas urges the valve member 104 in the downstream direction. The valve member 104 is not constrained by the main housing but is free to rotate about its axis and to move axially against the valve seat 102. The valve seat 102 is prevented from moving axially, radially, or rotationally. The valve seat 102 is a generally flat ring-shaped or annular member having a plurality of orifices 103 (FIG. 3) circumferentially spaced apart about a circumference of the valve seat, the orifices 103 extending generally axially between the upstream and downstream faces of the valve seat. The orifices 103 can be uniformly or non-uniformly spaced about the circumference of the valve seat.

The rotary valve member 104 is a generally flat ring-shaped or annular member having a plurality of orifices 105 (FIG. 2) circumferentially spaced apart about a circumference of the valve member, the orifices 105 extending generally axially between the upstream and downstream faces of the valve member. The orifices 105 can be uniformly or non-uniformly spaced about the circumference of the valve member. The number and spacing of the orifices 105 in the valve member can be the same as the number and spacing of the orifices 103 in the valve seat. However, non-uniform spacing of the orifices 105 is also possible and can be advantageous in some circumstances; furthermore, the spacings of the orifices 103 and 105 do not have to be the same, and in some cases it can be advantageous for the spacings to be different. The main housing 92 and the housing insert 94 both define substantially circular bearing surfaces for the outer and inner edges of the rotary valve member 104 and there are clearances therebetween, so that the valve member 104 can be rotated in one direction or the opposite direction about its central longitudinal axis in order to vary a degree of alignment between the valve member orifices 105 and the valve seat orifices 103.

The valve member 104 is engaged by the distal end of an L-shaped drive arm 110 (FIG. 3) a portion of which passes through a bushing installed in a bore defined in the main housing 92, the bore connecting with the annular flow passage 98. The proximal (radially outer) end of the drive arm 110 is located outside the main housing 92 and is rigidly affixed to a link 130. An actuator 140 is provided for rotating the drive arm 110. The link 130 has a connecting member 132 that is offset from the rotation axis of the drive arm 110 and that is coupled to an actuator rod 142 of the actuator 140 such that extension of the actuator rod causes the link 130 to rotate the drive arm 110 in one direction and retraction of the actuator rod causes the link to rotate the drive arm 110 in the opposite direction. As a result, the drive arm 110 causes the valve member 104 to be rotated in one direction or the opposite direction about its axis.

Thus, the turbocharger and engine cylinder head assembly 10 has the following major components: the CHRA 32, the cap 80, the wastegate unit 90, and the cylinder head 20 with its integral housing member 40. Viewed from the standpoint of the turbocharger supplier, there are only three main components or modules: the CHRA 32, the cap 80, and the wastegate unit 90. Integration of certain features into the engine cylinder head as described above thereby allows a substantial simplification of the turbocharger components to be supplied to the engine manufacturer or assembler. Additionally, the diffuser 44 is defined by two surfaces (respectively defined by the cap 80 and the center housing flange 72) that are easily machined or otherwise formed to high precision, such that the dimensions of the diffuser 44 can be controlled to a high degree of accuracy. Furthermore, the dimensions of the diffuser can easily be changed by substituting a cap 80 of different configuration.

Embodiments of the invention can also include a "reversed" compressor volute 46. In a conventional turbocharger, the compressor volute is located on the compressor side of the diffuser through which the pressurized air is led into the volute, and accordingly the compressor volute is part of the cast compressor housing. This design has been essentially standard for many decades.

In contrast, the turbocharger and engine cylinder head assembly described herein, in the illustrated embodiments, employs a substantially different design in which the compressor volute 46 is reversed so that it is located on the turbine side of the diffuser 44. Locating the compressor volute on the turbine side of the diffuser improves accessibility to the diffuser area for machining.

Figure 4:
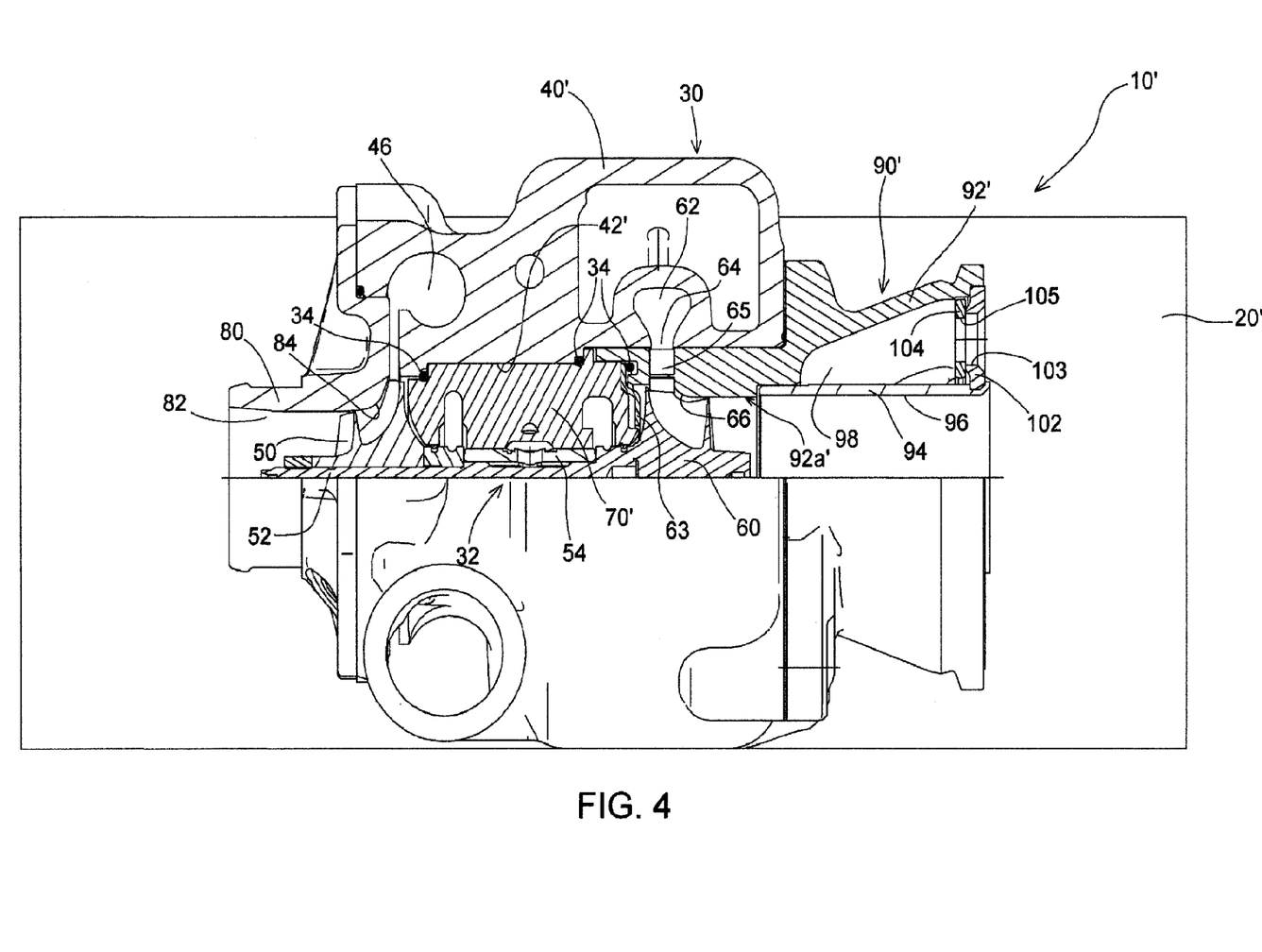
FIG. 4 is a partly sectioned front view, similar to FIG. 2, showing a turbocharger and engine cylinder head assembly in accordance with a second embodiment.
Figure 5:
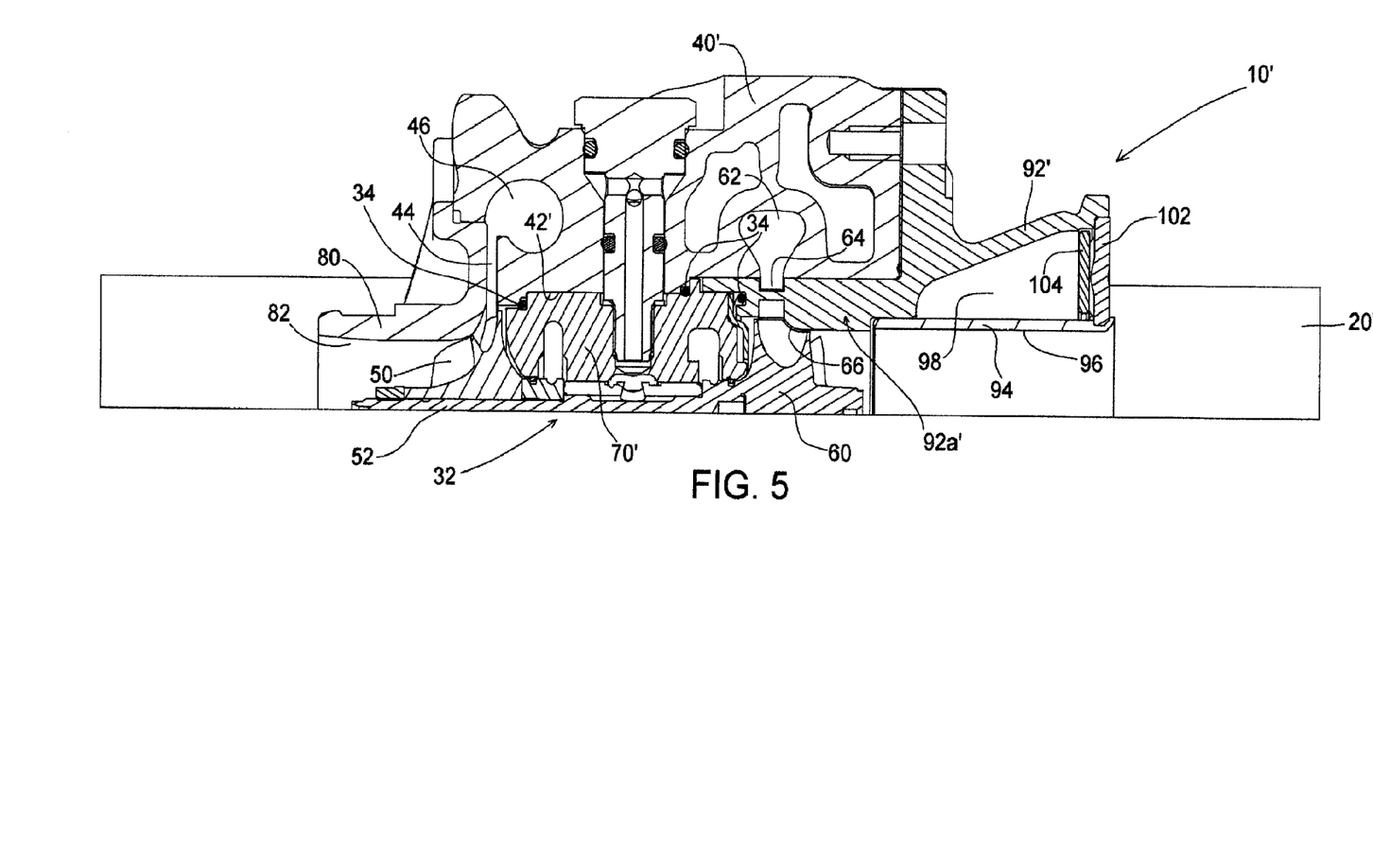
FIG. 5 is a cross-sectional view through the turbocharger and engine cylinder head assembly of FIG. 4.

A turbocharger and engine cylinder head assembly 10' in accordance with a second embodiment of the invention is depicted in FIGS. 4 and 5. The assembly 10' has many similarities to the assembly 10 described above, and the same reference numerals are used in FIGS. 4 and 5 to refer to substantially similar (although not necessarily identical) features appearing in FIGS. 1-3. Features of the second embodiment in which the primary differences reside are denoted by similar reference numerals but with a prime (') superscript. Thus, assembly 10' comprises an engine cylinder head 20' (illustrated only schematically) on which a turbocharger 30 is mounted. The engine cylinder head 20' has some differences relative to the head of the previous embodiment, on account of the differently configured turbocharger with which it is assembled.

The cylinder head 20' defines a housing member 40' as an integral part thereof. The head proper and the housing member collectively can be, for example, a one-piece casting. As further described below, the housing member 40' is configured to define a number of features that would conventionally be defined by separate housing members of the turbocharger 30.

With reference to FIGS. 4 and 5, the turbocharger 30 includes a "cartridge" or center housing rotating assembly (CHRA) 32. The CHRA 32 comprises a compressor wheel 50 affixed to one end of a shaft 52 and a turbine wheel 60 affixed to the opposite end of the shaft 52, bearings 54 that rotatably support the shaft 52, and a center housing 70' that houses the bearings 54 and defines oil passages for supplying oil to and scavenging oil from the bearings, and (optionally) water passages for circulating coolant through the center housing.

The housing member 40' of the cylinder head 20' defines a receptacle 42' that receives the CHRA 32. The receptacle 42' is a stepped, generally cylindrical bore extending axially through the housing member 40'. The receptacle is configured to allow the CHRA 32 to be slid axially into the receptacle, compressor wheel first (i.e., to the left in FIGS. 4 and 5). Thus, the receptacle 42' for example can have various portions of differing inside diameters, with steps transitioning between adjacent portions of different diameters. The steps are turbine-side-facing, i.e., each step faces axially toward the turbine side of the CHRA (to the right in FIGS. 4 and 5), and thus the receptacle becomes progressively smaller in diameter in the direction from the turbine toward the compressor. The center housing 70' of the CHRA 32 is correspondingly stepped to substantially match the stepped configuration of the receptacle 42'. There are seals (e.g., O-rings) 34 between the center housing 70' and the receptacle 42' for sealing the interface therebetween and to separate or isolate the oil passages and the water passages (if present) in the center housing.

The assembly also includes a cap 80 that defines one wall of the diffuser 44 for the compressor. The cap 80 can also define a compressor inlet 82 and a compressor contour 84. In the illustrated embodiment, the cap 80 is formed separately from the housing member 40' and is attached to the housing member by threaded fasteners (not shown). The housing member 40' of the engine cylinder head 20' defines the opposite wall of the diffuser 44. The housing member also defines a "reversed" compressor volute 46 that receives the air from the diffuser, and a turbine volute 62 for receiving exhaust gas from an engine.

A wastegate unit 90' generally similar to that of the previously described embodiment is connected to the housing member 40'. The housing member 92' of the wastegate unit 90' includes a portion 92a' that is received into the receptacle 42' of the engine cylinder head housing member 40' and that defines a turbine nozzle 64 and a turbine contour 66. The turbine nozzle comprises an aperture extending substantially 360 degrees about the housing member 92' and extending from a radially outer surface to a radially inner surface of the housing member. An array of circumferentially spaced vanes 65 extend across the turbine nozzle 64. The vanes 65 provide a flow-guiding function for guiding the exhaust gas into the turbine wheel 60 in an advantageous direction. In the illustrated embodiment, the wastegate housing 92' also includes a portion that defines a bore into which an end of the center housing 70' is received. A separate heat shield 63 is captured between the end of the center housing and the portion of the wastegate housing 92'.

An advantage of the turbocharger cartridge and engine cylinder head assembly 10' is that the CHRA 32 having the wastegate unit 90' constitutes a single component that can simply be inserted into the receptacle 42' defined by the housing member 40' of the cylinder head 20'. The assembly is completed by affixing the wastegate housing 92' and the cap 80 to the housing member 40' of the cylinder head, such as with threaded fasteners (not shown). Integration of certain features into the engine cylinder head as described above thereby allows a substantial simplification of the turbocharger components to be supplied to the engine manufacturer or assembler. Additionally, as noted for the previous embodiment, the formation of the diffuser 44 by cooperation between the cap 80 and an easily accessible surface (in this case, of the engine cylinder head) facilitate precise formation of the diffuser. Further, the "reversed" compressor volute configuration further improves accessibility to the diffuser area for machining.

The embodiments described above thus allow a highly precise diffuser 44 to be achieved even while integrating the compressor volute 46 into the engine cylinder head 20.

A further advantage of the described embodiments is that the compressor designer has improved flexibility in altering the configuration of the inlet 82 and/or contour 84 in a simple fashion by modifying the relatively low-cost cap 80 rather than redesigning a complex compressor housing to make such changes. The cap 80 also can be of a different material from other housing components if desired.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger and engine cylinder head assembly, comprising:
    a center housing rotating assembly comprising a center housing defining a bore therethrough, bearings housed in the bore, a shaft rotatably supported in the bearings, a compressor wheel affixed to one end of the shaft, and a turbine wheel affixed to an opposite end of the shaft;
    an engine cylinder head defining a receptacle for receiving the center housing rotating assembly, the engine cylinder head defining a compressor volute;
    a diffuser for receiving and diffusing the compressed air from the compressor wheel and supplying the compressed air to the compressor volute; and
    a cap formed separately from the engine cylinder head and removably secured to the engine cylinder head, the cap defining one wall of the diffuser;
    wherein an opposite wall of the diffuser is defined by one of the engine cylinder head and the center housing.

2. The turbocharger and engine cylinder head assembly of claim 1, configured so that the center housing rotating assembly is axially received, turbine-wheel-first, into the receptacle in the engine cylinder head, wherein the center housing includes a radially outwardly extending flange defining said opposite wall of the diffuser.

3. The turbocharger and engine cylinder head assembly of claim 2, wherein the engine cylinder head defines a turbine volute.

4. The turbocharger and engine cylinder head assembly of claim 3, wherein the engine cylinder head defines a turbine nozzle and a turbine contour.

5. The turbocharger and engine cylinder head assembly of claim 1, configured so that the center housing rotating assembly is axially received, compressor-wheel-first, into the receptacle in the engine cylinder head, wherein the portion of the engine cylinder head defines said opposite wall of the diffuser.

6. The turbocharger and engine cylinder head assembly of claim 5, wherein the engine cylinder head defines a turbine volute.

7. The turbocharger and engine cylinder head assembly of claim 6, further comprising an additional housing member formed separately from the engine cylinder head and having a portion received into a turbine end of the receptacle in the engine cylinder head, wherein said portion of the additional housing member defines a turbine nozzle and a turbine contour.

8. The turbocharger and engine cylinder head assembly of claim 7, wherein said portion of the additional housing member defines vanes for the turbine nozzle.

9. The turbocharger and engine cylinder head assembly of claim 7, wherein the additional housing member houses a wastegate operable to allow exhaust gas to bypass the turbine wheel.

10. The turbocharger and engine cylinder head assembly of claim 1, wherein the compressor volute is located on a turbine side of the diffuser.

11. The turbocharger and engine cylinder head assembly of claim 1, wherein the cap defines an inlet for the compressor.

12. The turbocharger and engine cylinder head assembly of claim 1, wherein the cap further defines a compressor contour.

* * * * *